Dec. 31, 1968  E. BYCZKOWSKI ET AL  3,418,676
WINDSHIELD WIPER AND WASHER SYSTEM
Filed Feb. 17, 1967  Sheet 1 of 2
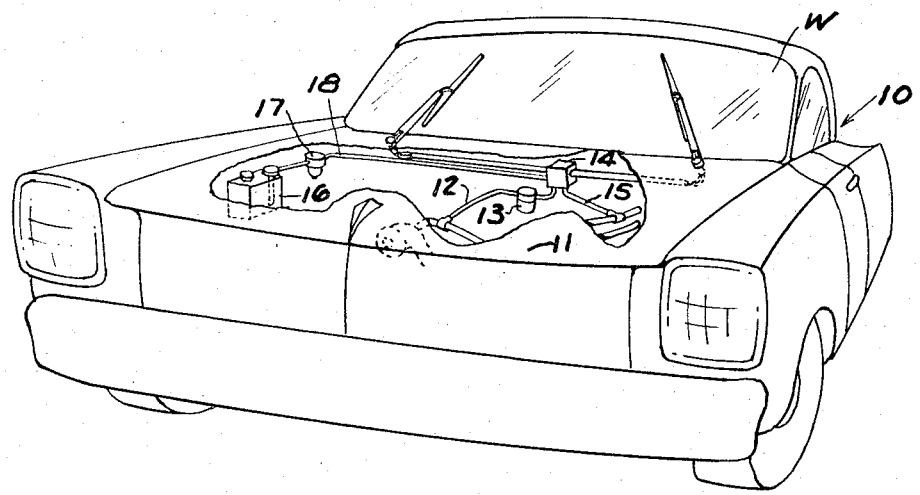
FIG. 1
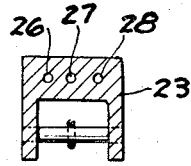
FIG. 5
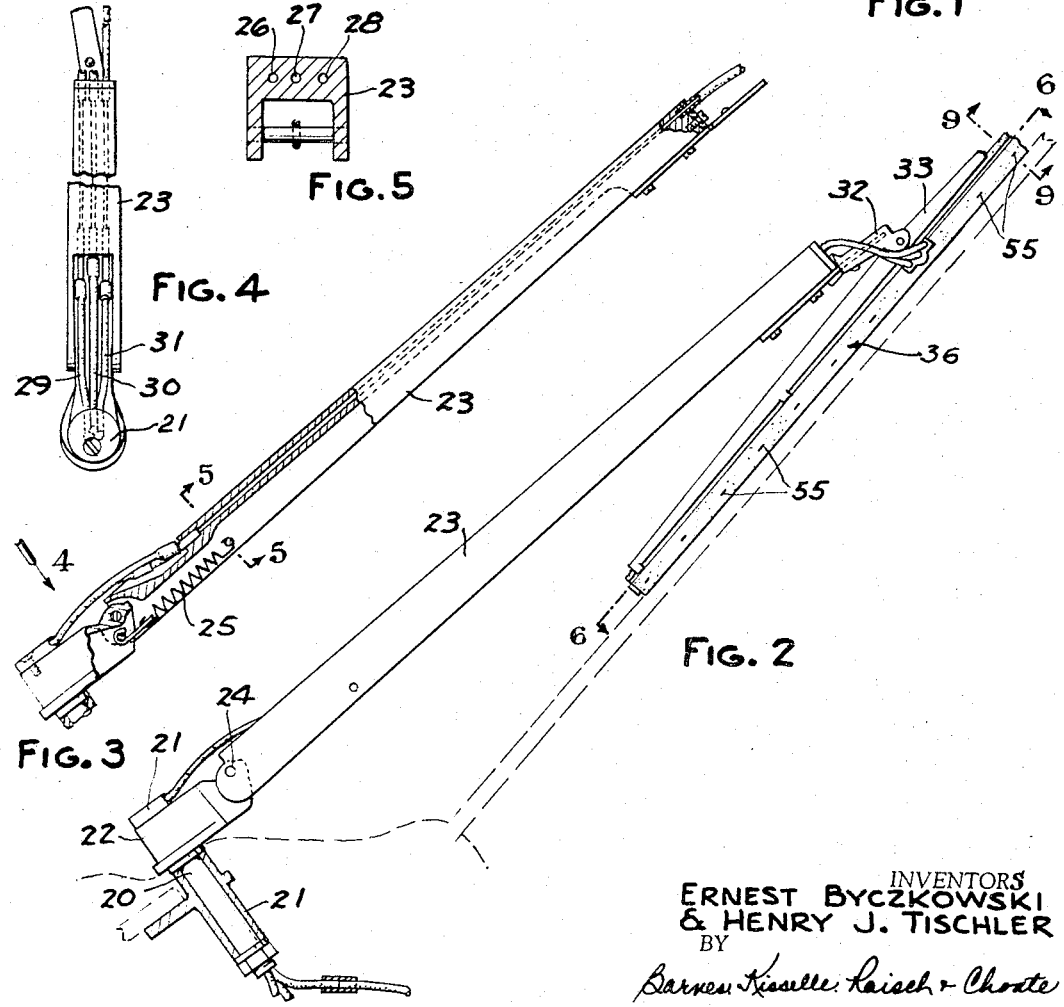
INVENTORS
ERNEST BYCZKOWSKI
& HENRY J. TISCHLER
BY
Barnes, Kisselle, Raisch & Choate
ATTORNEYS

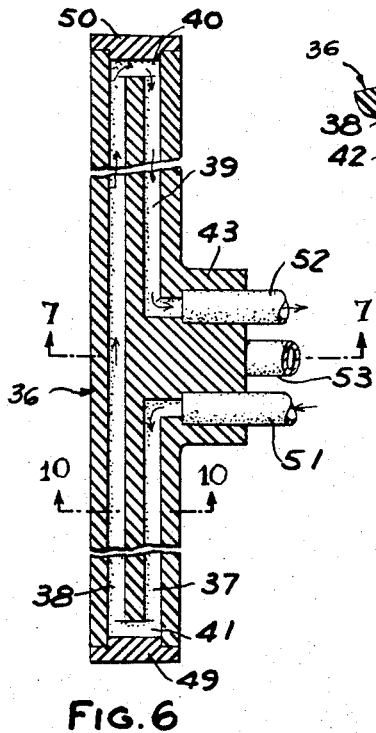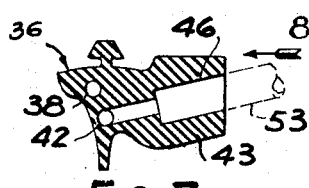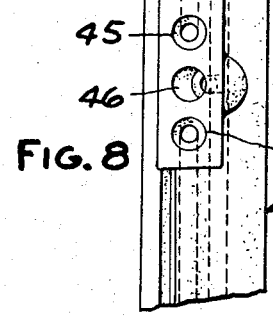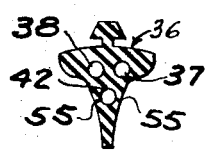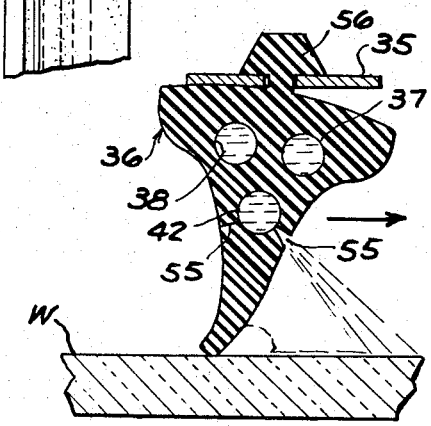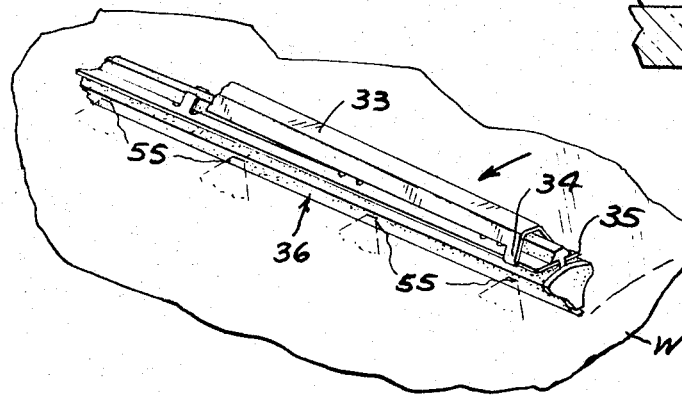
INVENTORS
ERNEST BYCZKOWSKI
& HENRY J. TISCHLER
ATTORNEYS

# United States Patent Office 3,418,676
Patented Dec. 31, 1968

3,418,676
WINDSHIELD WIPER AND WASHER SYSTEM
Ernest Byczkowski, Detroit, and Henry J. Tischler, Bloomfield Hills, Mich., assignors to Young Spring & Wire Corporation, Detroit, Mich., a corporation of Delaware
Filed Feb. 17, 1967, Ser. No. 616,973
6 Claims. (Cl. 15—250.04)

ABSTRACT OF THE DISCLOSURE

A windshield wiper and washer system comprising a windshield wiper arm that is pivoted adjacent the windshield and has three passages therein, two of which are connected to the liquid circulating system of the engine and the third of which is connected to a source of windshield washer liquid. The windshield wiper arm, in turn, supports a windshield wiper blade intermediate its ends, the blade also having three passages therein, two of which communicate with one another and are connected to two of the passages in the wiper arm to form a closed liquid coolant circulating system for heating the windshield wiper blades when the engine is operating and the liquid coolant is circulated. The third passage in the windshield wiper blade is connected to the third passage in the wiper arm and the wiper blade is formed with sealable openings therein so that when the blade is moved along the windshield and pressure is applied to the washing liquid, the liquid is dispensed against the windshield due to the flexing of the windshield wiper blade.

Summary

Among the objects of the invention are to provide a windshield wiper and washer system wherein the windshield wiper blades are always maintained warm to keep them clear and movable on the windshield and wherein liquid coolant can always be directed to the blade onto the windshield regardless of the temperature conditions.

Description of the drawings

FIG. 1 is a part sectional partly diagrammatic view of an automotive vehicle embodying the invention.

FIG. 2 is a fragmentary side elevational view of a portion of the vehicle shown in FIG. 1.

FIG. 3 is a part sectional view of a portion of the system shown in FIG. 2.

FIG. 4 is a fragmentary view in the direction of the arrow 4 in FIG. 3.

FIG. 5 is a fragmentary sectional view on an enlarged scale taken along the line 5—5 in FIG. 3.

FIG. 6 is a fragmentary sectional view taken along the line 6—6 in FIG. 2.

FIG. 7 is a fragmentary sectional view taken along the line 7—7 in FIG. 6.

FIG. 8 is a fragmentary view taken in the direction of the arrow 8 in FIG. 7.

FIG. 9 is a fragmentary sectional view taken along the line 9—9 in FIG. 2.

FIG. 10 is a fragmentary sectional view taken along the line 10—10 in FIG. 6 showing the relative positions of the parts during operation of the windshield wiper blade.

FIG. 11 is a fragmentary perspective view showing the operation of the windshield wiper blade on a windshield.

Description

Referring to FIG. 1, the windshield wiper system embodying the invention is adapted to be used in connection with an automotive vehicle 10 that includes a liquid cooled engine 11 through which liquid is circulated by appropriate means such as a fluid pump (not shown). In accordance with the invention, the liquid cooled coolant from the engine 11 is drawn through a line 12 by a pump 13 and directed to a header 14 and, in turn, through the windshield wiper assembly wherein it is circulated through the windshield wiper blades and returned by a line 15 to the engine 11. The header 14 also distributes washing liquid from a source 16 when a pump 17 is operated to direct liquid through a line 18 to the header and, in turn, to the windshield wiper blade. The windshield wiper blades are constructed as presently described to direct the washing liquid against the windshield.

Specifically, as shown in FIGS. 2 and 3, each windshield wiper assembly comprises a post 20 that is rotatably mounted in a bracket 21 on the vehicle. The post 20 includes three passages therethrough which are connected to the lines 12, 15 and 18, respectively. The passages in the post 20 extend upwardly to a cap 21 that has three passages therein. A bracket 22 is fixed to the upper end of the post for rotation therewith and a wiper arm 23 is pivoted to the bracket 22.

As shown in FIG. 5, the wiper arm 23 includes three parallel passages therethrough designated 26, 27 and 28. These passages are connected by flexible tubes 29, 30, 31 with the three passages in the cap 21 as shown in FIG. 4. The arm 23 has a mounting bracket 32 fixed on the free end thereof. The bracket 32, in turn, pivotally supports a resilient wiper mounting bracket 33 intermediate its ends as shown in FIG. 2. The bracket 33, in turn, has pads 34 thereon that are crimped over a flat elongated plate 35 which is mounted on the wiper blade 36 as shown in FIG. 11.

As shown in FIGS. 6–10, the wiper blade 36 is made of resilient material and is generally V-shaped in cross section. The blade 36 includes three passages 37, 38, 39 that extend longitudinally thereof. The passages 37, 38 are connected to one another by a cross passage 41 and the passages 38, 39 are connected by a cross passage 40 (FIG. 6). Blade 36 also includes a longitudinally extending passage 42. The blade further includes an integral laterally extending projection 43 intermediate its ends that has interconnecting passages 44, 45 and 46 that are connected respectively to the passages 37, 39 and 42 (FIG. 6).

The wiper blade 36 further comprises end caps 49, 50 that close the cross passages 41, 40. Flexible tubes 51, 52, 53 connect the interconnecting passages 44, 45, 46 with the passages 26, 28, 27, respectively. Thus, if liquid is introduced through passage 26 in the arm, it passes through successive passages in the blade and back outwardly through passage 28 in the arm to the engine. If the washing liquid is supplied under the pressure through the washing liquid passage 27, it passes through the passage 46 to the passage 42 as shown in FIG. 6.

As shown, the passage 42 is connected to the exterior of the wiper blade by longitudinally spaced slits 55 which are adapted to be opened as the blade is flexed in its movement back and forth across the windshield to permit the washing liquid to be directed in small jets outwardly against the windshield W as shown in FIGS. 10 and 11.

The wiper blade further includes a longitudinally extending projection 56 which is adapted to engage an opening in the blade 35 for mounting of the wiper on the bracket as shown in FIG. 10.

In use, when the engine of the vehicle is operating, liquid coolant is continuously circulated through the windshield wiper blade. Blades are thereby kept warm in case of cold weather so that the washing liquid can be dispensed therethrough. In addition, the warm liquid coolant flowing through the blade keeps the blade warm and thereby causes the blade to maintain a relatively free relationship to the windshield so that it can be readily moved as desired when it is necessary to clean the windshield.

We claim:
1. The combination comprising:
a liquid cooled engine,
means for circulating the liquid in said engine,
a windshield,
and a windshield wiper assembly comprising an arm,
means for pivoting said arm adjacent said windshield,
said arm having three passages for liquid therethrough,
means for connecting one of said passages to said liquid cooled engine,
means for connecting another of said passages to said liquid cooled engine whereby one of said passages forms a passage for liquid flowing from the engine and the other of said passages forms a passage for liquid flowing to the engine,
a wiper blade of resilient material,
means for pivotally mounting said wiper blade on said arm intermediate the ends of said blade,
said blade having three passages extending along the length thereof,
means for connecting one of said passages in said blade to one of said passages in said arm,
means for connecting the other of said passages in said blade to the other of said passages in said arm whereby liquid from the engine will flow to and from said passages,
means for connecting said first and second passages to one another within said blade,
means for connecting said third passage in said blade to the third passage in said arm,
said wiper blades having openings therein extending from said third passage to the exterior of said blade and operable upon flexing of said blade to permit liquid to flow from said third passage to the windshield.
2. The combination set forth in claim 1 wherein said means for connecting the passages in said arm to the passages in said blade comprises interconnecting passages intermediate the ends of said blade.
3. The combination set forth in claim 2 wherein said means for supporting said blade on said arm comprises at least one bracket pivotally mounted on the end of said blade,
said blade having a substantially flat mounting plate mounted thereon,
and means interconnecting said plate and said bracket.
4. The combination comprising
a windshield wiper assembly comprising
an arm,
means for pivoting said arm adjacent a windshield,
said arm having three passages for liquid therethrough,
means for connecting one of said passages to a liquid cooled engine,
means for connecting another of said passages to said liquid cooled engine whereby one of said passages forms a passage for liquid flowing from the engine and the other of said passages forms a passage for liquid flowing to the engine,
a wiper blade of resilient material,
means for pivotally mounting said wiper blade on said arm intermediate the ends of said blade,
said blade having three passages extending along the length thereof,
means for connecting one of said passages in said blade to one of said passages in said arm,
means for connecting the other of said passages in said blade to the other of said passages in said arm,
means for connecting said first and second passages to one another within said blade,
means for connecting said third passage in said blade to the third passage in said arm,
said wiper blades having openings therein extending from said third passage to the exterior of said blade and operable upon flexing of said blade to permit liquid to flow from said third passage to the windshield.
5. The combination set forth in claim 4 wherein said means for connecting the passages in said arm to the passages in said blade comprises interconnecting passages intermediate the ends of said blade.
6. The combination set forth in claim 4 wherein said means for supporting said blade on said arm comprises at least one bracket pivotally mounted on the end of said blade,
said blade having a substantially flat mounting plate mounted thereon,
and means interconnecting said plate and said bracket.

References Cited

UNITED STATES PATENTS

| 2,178,005 | 10/1939 | Smith | 15—250.01 XR |
| 2,348,502 | 5/1944 | Smulski | 15—250.04 |
| 3,304,569 | 2/1967 | Christensen | 15—250.04 |

PETER FELDMAN, *Primary Examiner.*

U.S. Cl. X.R.

15—250.6